United States Patent [19]

Corrigan

[11] 4,289,503

[45] Sep. 15, 1981

[54] POLYCRYSTALLINE CUBIC BORON NITRIDE ABRASIVE AND PROCESS FOR PREPARING SAME IN THE ABSENCE OF CATALYST

[75] Inventor: Francis R. Corrigan, Worthington, Ohio

[73] Assignee: General Electric Company, Worthington, Ohio

[21] Appl. No.: 47,656

[22] Filed: Jun. 11, 1979

[51] Int. Cl.$^3$ .............................................. B24D 3/28
[52] U.S. Cl. ...................................... 51/307; 51/288; 51/309; 423/290
[58] Field of Search ................. 51/307, 308, 309, 288; 423/290; 428/627

[56] References Cited

U.S. PATENT DOCUMENTS

| | | | |
|---|---|---|---|
| 3,212,852 | 10/1965 | Bundy | 51/307 |
| 3,212,852 | 10/1965 | Bundy | 51/307 |
| 3,645,706 | 2/1972 | Bovenkerk | 51/309 |
| 3,918,931 | 11/1975 | De Uries et al. | 51/309 |
| 3,926,571 | 12/1975 | Labossier et al. | 428/627 |
| 4,008,055 | 2/1977 | Phaal | 51/307 |
| 4,089,931 | 5/1978 | Sharma et al. | 423/290 |

FOREIGN PATENT DOCUMENTS

| | | |
|---|---|---|
| 1303925 | 1/1973 | United Kingdom . |
| 1313533 | 4/1973 | United Kingdom . |
| 1317716 | 5/1973 | United Kingdom . |
| 1317716 | 5/1973 | United Kingdom . |

Primary Examiner—Donald E. Czaja
Assistant Examiner—W. Thompson
Attorney, Agent, or Firm—Douglas B. Little

[57] ABSTRACT

Cubic boron nitride has been made from powdered hexagonal boron nitride by a process which comprises vacuum firing of the HBN and conversion by high pressure-high temperature processing at 55–80 kilobars and 1600° C. to the reconversion temperature.

The high pressure reaction cell has a special design which prevents the entrance of impurities into the sample. This cell, referring to FIG. 2, comprises, for example, a carbon tube (8) enclosing concentric titanium sleeve (9). Within the cylinder defined by the tube and sleeve are: the HBN sample (4), carbon filler (3), shielding tantalum foil discs (2) and carbon end plugs (10).

The vacuum firing is done at pressures of $10^{-5}$—$10^{-10}$ mm Hg, 1400°–1900° C., for 5 minutes—4 hours, and is believed to form a thin, free-boron coating on the HBN particles.

The process works on both pyrolytic (turbostratic) and graphitic hexagonal boron nitride.

Grinding grits formed by milling cubic boron nitride chunks recovered from the high pressure-high temperature process have resulted in higher grinding ratios than commercially available CBN.

39 Claims, 5 Drawing Figures

POLYCRYSTALLINE CUBIC BORON NITRIDE ABRASIVE AND PROCESS FOR PREPARING SAME IN THE ABSENCE OF CATALYST

DESCRIPTION

TECHNICAL FIELD

This invention is related to a process for making cubic boron nitride. The process includes a pre-treatment process for the hexagonal boron nitride powder and variations in the reaction zone assembly of the high pressure-high temperature apparatus known to the art and typified by that described in U.S. Pat. No. 2,947,617. One object of this invention is to produce a polycrystalline cubic boron nitride (CBN) abrasive from hexagonal boron nitride (HBN) powder which is at least equivalent to single-crystal, catalyst-grown CBN (as made by the patent referred to above) when used in grinding applications.

BACKGROUND

U.S. patent application Ser. No. 812,283; filed July 1, 1977, describes a process for making sintered polycrystalline CBN compacts which utilizes pyrolytic HBN (PBN) in the absence of any catalyst such as those specified in U.S. Pat. No. 2,947,617. A compact is a mass of abrasive particles bonded together either: (1) in a self-bonded (see U.S. Pat. Nos. 3,852,078 and 3,876,751) relationship; (2) by means of a bonding medium (see U.S. Pat. Nos. 3,136,615; 3,233,988; 3,743,489; 3,767,371 and 3,918,931); or (3) by means of some combination of (1) and (2). U.S. Pat. No. 3,918,219 teaches the catalytic conversion of HBN to CBN in contact with a carbide mass to form a composite body. CBN compacts are comprised of a plurality of CBN crystals suitably bonded together to form a large, integral, tough, coherent, high-strength mass. Compacts are used in such applications as machining, dressing and drilling (see U.S. Pat. Nos. 3,136,615 and 3,233,988).

A method for the conversion of HBN to CBN in the absence of catalyst is described in U.S. Pat. No. 3,212,852 (100 kilobars and 3600° K.)—see also: Wakatsuki, et al., "Synthesis of Polycrystalline Cubic BN (VI)", and Ichinose, et al., "Synthesis of Polycrystalline Cubic BN (V)", both in *Proceedings of the Fourth International Conference of High Pressure*, Kyoto, Japan (1974), pp. 436–445; U.S. Pat. No. 4,016,244; Wakatsuki et al., Japanese Patent No. Sho 49-27518; Wakatsuki et al., Japanese Patent No. Sho 49-30357; Wakatsuki et al., Japanese Patent No. Sho 49-22925; Wakatsuki et al., U.S. Pat. No. 3,852,078; Wakatsuki et al., "Synthesis of Polycrystalline Cubic Boron Nitride", *Mat. Res. Bull.*, 7, 999–1004 (1972); and Sirota, N. British Patent No. 1,317,716.

British Patent No. 1,513,990 discusses the production of a cubic boron nitride compact prepared by high pressure-high temperature processing of mixtures of hexagonal boron nitride and boron powder.

An article by Corrigan and Bundy ("Direct Transition Among the Allotropic Forms of Boron Nitride at High Pressures and Temperatures", *The Journal of Chemical Physics*, Vol. 63, No. 9 (Nov. 1, 1975) p. 3812) discusses the effect of impurities (e.g., oxygen) in the high pressure-high temperature process for converting hexagonal boron nitride to cubic boron nitride at page 3814.

The heating of boron nitride to temperatures ranging from 1200°–2000° C. is reported to evolve nitrogen gas and leave a coating of boron in Dreger, L. H., et al., "Sublimation and Decomposition Studies on Boron Nitride and Aluminum Nitride", *J. Phys. Chem.*, 66 (1962) p. 1556.

Vacuum firing of isotropic hexagonal boron nitride to remove boron oxide prepatory to metallizing is mentioned in U.S. Pat. No. 3,926,571; col. 3.

Preliminary drying of HBN is disclosed in U.S. Pat. No. 4,150,098, see col. 3.

A method for producing aggregate abrasive grains for cutting tools, (through sintering a mixture of abrasive powders, metal alloy powders, and an adhesion-active agent to produce a cake which is subsequently crushed) is disclosed in U.S. Pat. No. 4,024,675.

Two forms of hexagonal boron nitride have been identified, turbostratic and ideal hexagonal or graphitic (GBN). The turbostratic structure is characteristic of pyrolytic boron nitride and is a continuous structure characterized by 2-dimensional layers of hexagonal rings stacked at irregular intervals and randomly oriented.

PBN is a low pressure form of HBN made typically by chemical vapor deposition of $BCl_3 + NH_3$ vapors on a graphite substrate. As deposited, it has a high purity of $99.99 + \%$, a density between about 2.0 and 2.18 $g/cm^3$ (compared to 2.28 for GBN), and a preferred orientation of the layer planes between 50° and 100° in the [001] direction (c-axis).

The structure of PBN, as with analogous pyrolytic carbon in the carbon system, is not well understood. Various models have been proposed to explain the structure of PBN and pyrolytic carbons. According to one of the more popular models, termed turbostratic state, the B and N atoms form more or less parallel stacks of fused hexagonal BN layers, but with stacking being random in translation parallel to the layers and random in rotation about the normal to the layers. Other models emphasize imperfections and distortion within the layers. The increased interlayer spacing in the pyrolytic materials (3.42 A for PBN compared to 3.33 A for GBN) is attributed primarily to the disorder in the stacking direction resulting in attenuation of the weak van der Waals attraction between the layers. The structure in a mass of PBN is continuous in any given direction, as opposed to being separated by crystal boundaries.

The "as deposited" type of PBN will be referred to hereinafter as unrecrystallized PBN (U-PBN).

Another known type of PBN is recrystallized PBN (R-PBN). It is formed by compression annealing of PBN and has a theoretical density of 2.28 g/cm³, a highly crystalline structure with an interlayer spacing of 3.33 A, a purity of 99.99 + %, and a preferred layer plane orientation of about 2° or less in the [001] direction (c-axis). R-PBN is further described in U.S. Pat. No. 3,578,403.

Also, the aforementioned U.S. Pat. No. 3,212,852, col. 10, ll. 19–24, discloses the use of PBN as a starting material in direct conversion processes practiced at pressures above 100 kbars.

The layers of hexagonal rings in the graphitic form (GBN) are highly oriented giving a material which is soft, flaky and transparent. Further details on the two forms of HBN may be found in Thomas, J. et al., "Turbostratic Boron Nitride, Thermal Transformation to Ordered-layer-lattice Boron Nitride", J.A.C.S., Vol. 84, No. 24 (Jan. 25, 1963) p. 4619; and Economy, J., and Anderson, R., "Boron Nitride Fibers", *J. Polymer Science: Part C*, No. 19, (1967) p. 283.

SUMMARY OF THE INVENTION

The invention is summarized as a process for making cubic boron nitride from hexagonal boron nitride powder which comprises:

(A) removing boric oxide from the surface of the hexagonal boron nitride powder; and (B) converting the hexagonal boron nitride from Step A to cubic boron nitride by subjecting it to the high pressure-high temperature process:
  (i) at a pressure from 55–80 kilobars;
  (ii) at a temperature of 1600° C. to the reconversion temperature;
  (iii) for a time sufficient to convert the HBN to CBN and sinter the CBN; and
  (iv) in the absence of impurities which interfere with the conversion to cubic boron nitride or the sintering of cubic boron nitride.

Reconversion temperature is defined to be that temperature at which boron nitride reconverts from the cubic crystal structure to the hexagonal. This temperature is found along the equilibrium line separating the hexagonal boron nitride stable region from the cubic boron nitride stable region in the phase diagram for boron nitride (see U.S. Pat. No. 3,212,852; FIG. 6 and col. 8, line 66—col. 9, line 42).

A preferred time for Step B is 2–60 minutes, 3–10 minutes being more preferred.

The term "powder" in Step A is meant to include particles commonly considered granular as well as those commonly considered powder.

Step A above is the pre-treatment process referred to under technical field. Any method (e.g., heating under inert atmosphere) which removes the oxide from the surface of the raw material is satisfactory.

After pre-treatment, the hexagonal boron nitride is loaded in an appropriate high pressure cell and the loaded cell placed in a high pressure-high temperature apparatus. First, the pressure and then the temperature are increased and held at the desired conditions for sufficient time for conversion to cubic boron nitride and sintering to occur. The sample is then allowed to cool under pressure for a short period of time, and finally the pressure is decreased to atmospheric pressure, and the mass of polycrystalline cubic boron nitride recovered. Care must be exercised in the design of the high pressure cell to ensure against impurity penetration from exterior cell parts into the sample during the high temperature process.

CBN obtained from PBN will be referred to as P-CBN, and CBN from GBN will be referred to as G-CBN.

BEST MODE FOR CARRYING OUT THE INVENTION

Figure 1:
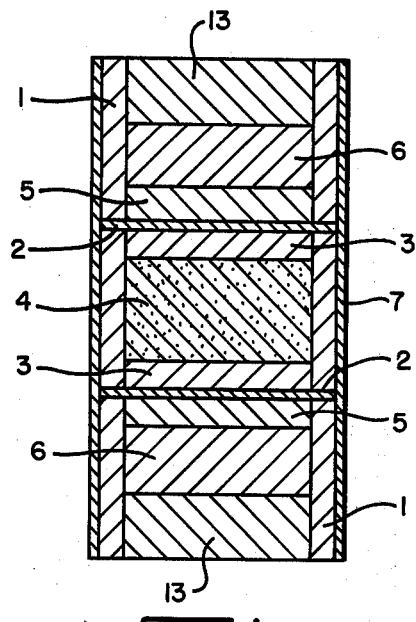
FIGS. 1–4 illustrate, in section, various configurations for reaction zone assemblies (or cells) for use within a high pressure-high temperature apparatus such as those described in U.S. Pat. Nos. 2,947,611; 2,941,241; and 2,941,248.

PBN powder may be prepared by milling pieces of scrap PBN articles. The milled powder will consist of high aspect ratio plate-like particles which may be either sieved to a particular mesh size particle for further conversion or converted in the unsieved condition.

Preferably, the pre-treatment process comprises vacuum heating or firing of the HBN powder to remove volatile impurities, particularly surface oxide contaminants (boron oxide). Vacuum firing of HBN feed stock powder is carried out in the HBN thermal decomposition temperature range where, in addition to degassing of the surface oxide contaminant, a thin coating of free boron is generated (from decomposition) on the surfaces of the oxide-free powder particles.

The amount of free surface boron developed will depend on the vacuum, temperature, time and particle size. The article by Dreger referred to in the background section gives the decomposition pressure of nitrogen over boron nitride as a function of temperature and serves as a guide to the vaccum/temperature conditions needed for thermal decomposition. At initial pressure of $10^{-3}$ to $10^{-10}$ mm. Hg, temperatures in the order of 1400°–1900° C. and above would allow for sufficient thermal decomposition to occur in a reasonable time (5 minutes to 4 hours). Within these ranges the $B_2O_3$ surface contaminant will be degassed and increasing amounts of free surface boron will be generated with increasing firing temperature or time (see above-cited Dreger report). Of course, the temperature is related to the time, processing at higher temperatures taking less time than low temperatures.

The relative amount of free boron developed can be inferred visually from the discoloration of the vacuum-fired powder. At the lower firing temperatures (1500°–1650° C.), where only a slight amount of surface boron is generated, vacuum-fired powder has a light reddish brown tint. The depth of color increases with increasing firing temperature or time until, at the higher firing temperatures (1800°–1900° C.), the particles are covered with a black boron surface coating.

The type of converted material obtained from PBN has been found to be strongly influenced by the amount of free boron generated during the vacuum-firing process. With only a slight amount of free boron, many particle interfaces could still be distinguished in the converted material and after milling many translucent yellow/brown particles are obtained similar to the type of particles obtained from milling of PBN compacts obtained by the process of U.S. Ser. No. 812,283. Conversion of high-temperature-fired PBN powder (excess-free boron) yields a completely fused black mass in which no particle interfaces can be distinguished and the milled particles are opaque black. The grinding performance is also significantly influenced by the amount of free boron on the vacuum-fired powder.

Vacuum firing is felt to pacify the powder to reoxidation on re-exposure to the atmosphere. It has been theorized that the surface layer of boron developed during the vacuum firing catalyzes the HBN to CBN conversion process. This layer is necessary in the case of graphitic hexagonal boron nitride (GBN).

In carrying out the pre-treatment, a quantity of HBN powder in a non-reactive container (carbon, graphfoil, tantalum, etc.) is placed in a vacuum furnace and heated under vacuum for a time sufficient to vaporize the surface oxide contaminant and form a thin, free boron coating by thermal decomposition on the powder particles. The maximum particle dimension is usually about 0.1-10 microns for GBN and from submicron to about 3.3 mm for PBN.

After the vacuum-firing pre-treatment step, the sample is allowed to cool under vacuum, removed from the vacuum furnace, and loaded in a reaction zone assembly which is placed in a high pressure-high temperature (HP/HT) apparatus. First the pressure and then the temperature are increased and held at the desired conditions for sufficient time for conversion and sintering to occur. The sample is then allowed to cool under pressure for a short period of time, and finally the pressure is decreased to atmospheric pressure, and the mass of polycrystalline CBN recovered.

Conversion to black polycrystalline masses has been obtained experimentally with vacuum-fired commercial grade HBN powders at pressure of 55-70 kbar and temperatures of from about 1800°-2300° C.

Figure 2:
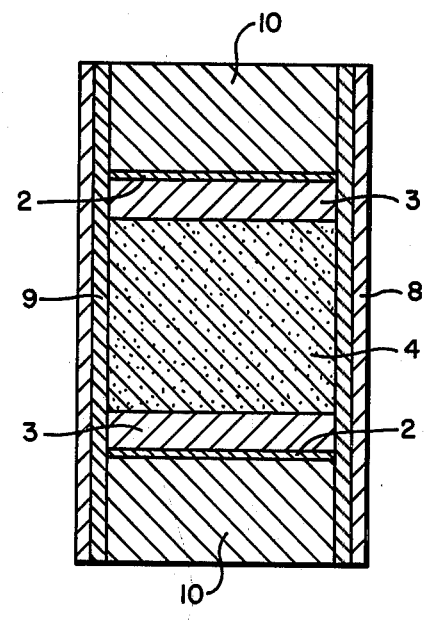
Figure 3:
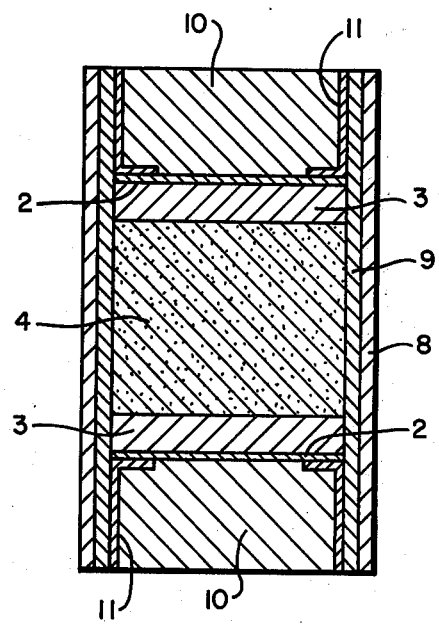
Figure 4:
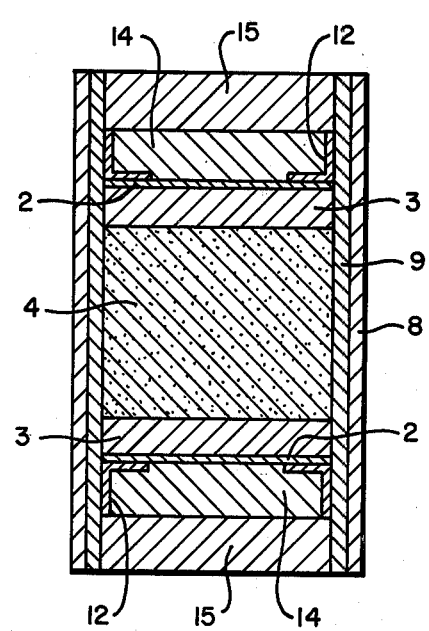

The reaction zone assemblies or cells of FIGS. 1-4 consist of a carbon tube 1 (or 8 for FIGS. 2-4) disposed inside (or outside for FIGS. 2-4) of and concentric to a cylindrical sleeve 7 (9 for FIGS. 2-4). The cylindrical sleeve is to prevent impurity penetration from exterior cell parts into the sample during the high pressure-high temperature process. The shield metal from which the sleeve is made is a refractory metal which could be selected from the group consisting of zirconium, titanium, tantalum, tungsten and molybdenum.

Within the cylinder defined by the carbon tube and the shield metal sleeve, are disposed the sample of HBN 4 to be subjected to elevated pressures and temperatures (within the central cavity) and other cell components. The sample is protected above and below by shielding discs 2 made of a refractory metal which can be selected from the above-mentioned group. Plugs of carbon 3 are disposed between each end of the sample and the shielding metal discs as a filler.

The opposite ends of the reaction zone assemblies are fitted with plugs for transmitting pressure to the sample. The plugs are made of a refractory material which is a thermal insulator (e.g., lava). In FIG. 1, each such plug is comprised of a first hot-pressed boron nitride plug 5 adjacent to the shielding metal disc, a carbon plug 6 disposed between the first hot-pressed boron nitride plug and the second hot-pressed boron nitride plug 13. In FIG. 2, the end plugs 10 are comprised of hot-pressed boron nitride.

Alternatively, in FIG. 3, a metal foil wrap 11, made from a refractory metal selected from the same group used for the metal disc and sleeve, is disposed around the hot pressed boron nitride end plugs. The wrap is crimped over the interior end of said plugs, allowing for radial expansion of the wrap during compression to fill any gaps between the metal discs and the protective sleeve. In FIG. 4, the wrap 12 covers only a part of the end plug (rather than completely covering as in FIG. 3). The end plug in FIG. 4 is comprised of a first hot-pressed boron nitride plug 14 about which the foil is wrapped and crimped and a second hot-pressed boron nitride plug 15 which fills the space between the first plug and the end of the cell.

Typically, commercially available hot-pressed boron nitride comprises boron nitride powder mixed with boric oxide (3-4%) binder which is hot pressed into a convenient shape (e.g., rod) at temperatures in excess of 2000° C. and pressures of about 1000 psi (6.895 kPascals) in the presence of oxygen. It is available commercially under such trade names as grade HBN from Union Carbide Corporation.

Graphite may be mixed with the HBN sample to prevent particle fusion.

It is a part of the preferred mode to prepress the HBN samples (which can be fluffy) in the protective metal sleeve. This prepressing is performed in a hand press, a suitable pressure being about 20,000 psi (137.9 kPa).

The preferred conditions for the high pressure-high temperature process are 65-75 kbar, 2000°-2300° C. and 8 minutes press time.

The cubic boron nitride may be recovered from the matrix of the reaction zone assembly after the high pressure-high temperature process by: (1) breaking off the ends of the cell comprising the end plugs; (2) mixing the remaining material with a mixture of sulfuric and nitric acids (e.g., 90:10 volume ratio sulfuric to nitric acid); (3) washing the undissolved solids in water; (4) mixing the solids with a mixture of nitric and hydrofluoric acids (volume ratio of about 50/50 to 90/10 $HNO_3$ to HF) to dissolve the remaining shield metal, carbon, and gasket material; and (5) a final water wash of the CBN solid pieces.

CBN grit is obtained from milling the recovered pieces of CBN. Such grit may also be formed through size reduction operations performed on the compacts of application Ser. No. 812,283 (e.g., milling or crushing).

Wheel tests of P-CBN type abrasive have shown improved performance compared to the catalyst-grown type CBN abrasive currently used in grinding applications. The difference in performance is believed to be primarily due to differences in internal structure between the P-CBN particles and catalyst-grown abrasive particles. The catalyst-grown abrasive particles are single crystals which contain relatively weak cleavage planes. The P-CBN material has a highly defective structure which thus contains no gross cleavage planes and in which fracture propagation is retarded by the structural defects resulting in stronger, tougher particles.

The difference in performance may also be related to differences in morphology between the P-CBN and catalyst-grown particles. The catalyst-grown particles have regular, flat, smooth surfaces dictated by the single-crystal growth conditions of the process whereas the P-CBN particles may have both macro and micro irregular morphology depending on the processing conditions and milling procedure.

In carrying out the HP/HT conversion process for the preparation of P-CBN grit, it has been found that the micro-structure of the P-CBN material varies dependent on the HP/HT process conditions. P-CBN made at lower processing temperatures have a highly defective (small crystallite size) structure. With increasing processing temperatures the crystallinity improves until, at the highest temperature, individual crystallites of 10 microns or more may be observed.

In order to investigate the effects of the internal lattice structure on performance, two types of P-CBN grit were selected for testing:

(a) material having the highly defective/small crystallite size structures prepared at low temperatures, designated SCS; and (b) material having large crystallites made at high temperatures designated LCS.

The processing temperature at which the SCS material can be prepared via the previously disclosed HP/HT conversion operations is between about 2000° to about 2100° C. LCS material is obtained at temperatures from above about 2100° C. to the reconversion temperature.

The invention will be further clarified by a consideration of the following examples, which are intended to be purely exemplary. In the experimental high pressure-high temperature runs, the maximum temperature was determined from previous power/temperature calibration runs with a FIG. 1 type cell. It was found in the temperature calibration runs that it takes about 3-4 minutes for a cell to reach maximum temperature. Therefore, the time at maximum temperature will be about 3-4 minutes less than the reported heating time.

EXAMPLE I

An 11V-9 flaring cup, resin-bonded grinding wheel, having a diameter of 3¾ inches (95.25 mm), ⅛ inch (3.18 mm) thick, and containing 18.75 volume percent of a commercially available CBN abrasive grit (BORAZON Type II, Trademark of General Electric Company) was prepared as a control. Four similar wheels were prepared, containing P-CBN abrasive grit obtained via impact milling of P-CBN compact discs (about ½ inch (13 mm) diameter×50-80 mils (1.3-2 mm) thick). The discs had been prepared by direct high pressure-high temperature conversion of PBN plates at 65-70 kbars, 1900° C. to 2000° C. for 3-10 minutes in accordance with the process of Ser. No. 812,283. Prior to impact milling, the P-CBN compacts were sandblasted to remove any material adhering to the compact surface. After impact milling, the powder obtained was sieved to size.

In order to investigate the effect of internal lattice structure, two types of P-CBN grit were selected for testing, one having small crystallite size structure prepared at low temperature (SCS) and the other having large crystallites prepared at high temperatures (LSC).

All of these abrasives were nickel coated with about 60 wt. percent nickel. Processes for applying nickel coating to cubic boron nitride particles are well known in the art (see British Patent No. 1,278,184).

The wheels were fitted to a No. 2 Cincinnati Milacron Tool and Cutter Grinder modified for automatic operation and tested by dry grinding a workpiece simulating M2 Tool Steel (60-62 Rockwell C hardness). The machine was operated at a wheel speed of 400 SFPM (122 M/Min.); a table speed of 8 FPM (2.62 M/Min.); and at In Feeds of 0.002 inch (0.051 mm) and 0.003 inch (0.076 mm). Measurements were taken to determine the grinding ratio and surface finish under each set of conditions. The results of the measurements taken are set forth in attached Table 1.

TABLE 1

| | Crystal | | Test Results | | | |
|---|---|---|---|---|---|---|
| | | | 0.002" In Feed | | 0.003" In Feed | |
| Wheel# | Designation | Mesh Size | Grinding Ratio | Surface Finish (AA) | Grinding Ratio | Surface Finish (AA) |
| 12866 | Control | 60/80 | 148 | 60 | 45 | 70 |
| 12838 | SCS P-CBN | 60/80 | 259 | 40 | 90 | 60 |
| 12834 | LCS P-CBN | 60/80 | 140 | 55 | 49 | 65 |
| 12837 | SCS P-CBN | 80/120 | 354 | 50 | 72 | 67 |
| 12835 | LCS P-CBN | 80/120 | 108 | 65 | 32 | 80 |

The small crystallite material performed best in each case.

EXAMPLE II

In order to investigate the effects of particle shape on grinding performance, a quantity of P-CBN of small crystallite size, which had been prepared from the above PBN powder in accordance with the procedures set forth in Example I (100/120 mesh) was separated into predominantly blocky (low aspect ratio) and predominantly flat (high aspect ratio) particle fractions (50/50 shape separation split). Shape separation was done on a shape sorting machine. Such machines are known to the art, and a description may be found in Dyer, Dr. H. B., "EMB Natural Diamonds", *Industrial Diamond Review*, (Aug. 1964) p. 192.

The results of tests performed on various workpieces, on the equipment and under the conditions set forth in Example I, are given in Table 3. The workpieces used were:

TABLE 2

| Workpiece | | Composition by Weight Percent | | | | | | | Hardness (Rockwell C) |
|---|---|---|---|---|---|---|---|---|---|
| | | C | Mn | Si | Cr | V | W | Mo | Co | |
| H 11 | Hot work tool steel | .30-.40 | .20-.40 | .80-1.20 | 4.75-5.50 | .30-.50 | | 1.25-1.75 | | 53-55 |
| M 2 | High speed tool steel, molybdenum base | .78-.88 | .20-.40 | .20-.40 | 3.75-4.50 | 1.60-2.20 | 5.50-6.75 | 4.50-5.50 | | 60-62 |
| T 15 | High speed tool steel, tungsten base | 1.50-1.60 | .20-.40 | .20-.40 | 4.50-5.00 | 4.75-5.25 | 12.00-13.00 | | 4.75-5.25 | 60-62 |

TABLE 3

| Workpiece Grade of Steel | Crystal Designation | Test Results | | | | | |
|---|---|---|---|---|---|---|---|
| | | 0.002" In Feed | | | 0.003" In Feed | | |
| | | Grinding Ratio | Relative Grinding Ratio | Finish (AA) | Grinding Ratio | Relative Grinding Ratio | Finish (AA) |
| H-11 | CONTROL | 475 | 1.0 | 55-60 | — | — | — |
| H-11 | P-CBN-BL | 145 | 0.3 | 80-85 | — | — | — |

TABLE 3-continued

| Workpiece Grade of Steel | Crystal Designation | Test Results | | | | | |
|---|---|---|---|---|---|---|---|
| | | 0.002" In Feed | | | 0.003" In Feed | | |
| | | Grinding Ratio | Relative Grinding Ratio | Finish (AA) | Grinding Ratio | Relative Grinding Ratio | Finish (AA) |
| H-11 | P-CBN-FL | 95 | 0.2 | — | — | — | — |
| M-2 | CONTROL | 140 | 1.0 | 45–60 | 40 | 1.0 | 57–67 |
| M-2 | P-CBN-BL | 440 | 3.2 | 30–40 | 49 | 1.2 | 70–75 |
| M-2 | P-CBN-FL | 330 | 2.1 | 55–65 | 33 | 0.8 | 25–32 |
| T-15 | CONTROL | 11 36 | 1.0 | 25–41 | — | — | — |
| T-15 | P-CBN-BL | 148 | 4.1 | 35–41 | — | — | — |
| T-15 | P-CBN-FL | 140 | 3.9 | 28–44 | — | — | — |

BL = Blocky Fraction
FL = Flat Fraction

The blocky fraction out performed the flat fraction in each case and performed better than the control in all but one.

EXAMPLE III

A quantity of PBN powder was generated by milling large size pieces of PBN scrap material into powdered form. The scrap PBN consisted of pieces of shaped PBN articles such as crucibles and dishes. The milled powder consisted primarily of high aspect ratio plate-like particles ranging in size from 12 mesh to dust.

In order to clean the PBN powder of surface oxide contamination prior to conversion to P-CBN the milled PBN powder was vacuum heated at various temperatures. A number of vacuum firing runs were made on the PBN powder contained in tantalum boats. After placing the samples in the vacuum furnace and evacuating the system to $10^{-5}$ to $10^{-6}$ mm Hg the samples were heated to the desired temperature for the desired length of time and allowed to cool under vacuum. A total of 9 vacuum firing runs containing from 5 to 41 gms of powder were made at firing temperatures from 1750°–1860° C. for times of 60–80 minutes. After vacuum firing, the initially white PBN powder was covered with a black layer of elemental boron.

A portion of the above vacuum-fired powder was used as is for HP/HT conversion to CBN utilizing FIG. 1 type high pressure cells. Samples were loaded in the cells and run in an HP/HT apparatus at 65–70 kbar and about 2000° C. for 10 minutes total heating time. The resulting polycrystalline CBN masses obtained were physically removed from the high pressure cell, treated with acid (about 10% $HNO_3$/90% $H_2SO_4$) to remove any adhering carbon and impact milled to powder form. The 60/80 fraction was separated out by sieving, cleaned in an ultrasonic water bath and air dried for wheel testing, sample X-7A.

A second portion of the above vacuum-fired PBN powder was treated with nitric acid to remove the boron developed during the vacuum firing prior to HP/HT conversion. The resulting (X-7B) polycrystalline CBN masses were processed as above for wheel testing.

The X-7C material was obtained using PBN powder vacuum fired at 1580°–1615° C. for 60–90 minutes using the same HP/HT conversion and post conversion processing as described above.

EXAMPLE IV

The 60/80 mesh fractions of the grits from Example III were tested in cup-type grinding wheels in a similar manner to Examples I and II. A control similar to that for Example I and a 60/80 mesh sample of unshaped P-CBN powder (prepared by milling HP/HT converted PBN plate), designated P-CBN-SU were also tested, for comparison. The results appear in Table 4. They demonstrate the effect of the boron layer and show a slight layer to be preferred.

TABLE 4

| Workpiece | Crystal Designation | Test Results | |
|---|---|---|---|
| | | 0.002" In Feed Grinding Ratio | Relative Grinding Ratio |
| M-2 | CONTROL | 209 | 1.0 |
| M-2 | P-CBN-SU | 388 | 1.8 |
| M-2 | X-7A | 221 | 1.1 |
| M-2 | X-7B | 378 | 1.8 |
| M-2 | X-7C | 456 | 2.2 |
| T-15 | CONTROL | 75 | 1.0 |
| T-15 | P-CBN-SU | 160 | 2.2 |
| T-15 | X-7A | 110 | 1.5 |
| T-15 | X-7B | 200 | 2.6 |
| T-15 | X-7C | 240 | 3.2 |

Examination of grinding wheels utilizing GBN abrasive particles, manufactured from GBN according to the steps given in the summary, indicated that pullout occurred early in the working life of the polycrystal, and the grit appeared dulled by attritious wear which would explain the early pullout. These observations are consistent with the nature of polycrystalline grit. The polycrystals are formed by the conversion and fusion of micron-sized HBN particles. Wear of the polycrystal via microchipping at the micron-sized particle interfaces would result in rounding of the initially sharp cutting points with the force on the polycrystal becoming sufficient to pull the particle from the bond before macro-type sharp point regenerating fracture of the particle can occur.

Therefore, the preferred mode of the invention, when GBN is the raw material, further comprises the following modification. Between Steps A and B, the vacuum-fired GBN powder is mixed with a quantity of single-crystal CBN particles having a maximum dimension range from 5–150 microns (preferably 12–50) in a concentration of 5–30 volume percent single-crystal, catalyst-grown CBN (preferably 10–15 volume percent). The resulting mixture is then converted according to Step B, yielding an aggregated CBN mass composed of single-crystal CBN particle embedded in the boron-rich polycrystalline CBN matrix.

The purpose of this modification is to incorporate single-crystal CBN particles in the polycrystals in order to advantageously alter the breakdown characteristics of the polycrystals in such a manner as to improve their grinding performance.

U.S. Pat. No. 3,852,078 discloses bonded CBN bodies in which HBN is mixed with CBN before HP/HT processing, but no pretreatment of the HBN is required.

EXAMPLE V

Production of Aggregated G-CBN Grits

The GBN powder used in these experiments was Carborundum Company-grade HPF. It was vacuum fired at 1760°–1770° C. for 55 minutes. The vacuum pressure was initially in the range of $10^{-6}$ to $10^{-5}$ mm Hg and increased to greater than $10^{-3}$ mm Hg during heating due to nitrogen gas evolution as a result of surface thermal decomposition of the HBN powder. After vacuum firing, the initially white powder had a gray appearance due to the free boron surface coating.

The vacuum-fired powder was then mixed with the single-crystal CBN additive. A series of high pressure-high temperature conversion runs was made on various mixtures using the high pressure cell of FIG. 2 having tantalum foil discs 2 and a titanium tube 9. Samples were prepressed in the titanium tube at 20,000 psi (137.9 kPa) and run in a high pressure apparatus at about 65–75 kbar for 8 minutes at a temperature sufficient for conversion and fusion of the vacuum-fired powder.

The resulting composite masses were opaque black with the single-crystal CBN particles clearly visible and firmly embedded in the polycrystalline CBN matrix. The large clumps were impact milled to powder, size separated, water bath ultrasonic cleaned and air dried. Table 5 below summarizes three typical runs.

TABLE 5

| | Aggregate Abrasives | | | |
|---|---|---|---|---|
| Designation | Aggregate Mesh Size | Single Crystal Mesh Size | Single Crystal Concentration-% | Average Number of Single Crystals/Grain |
| X-7D2 | 60/80 | 140/170 | 30 | 3.2 |
| X-7D1 | 60/80 | 200/230 | 20 | 6.4 |
| X-7D3 | 60/80 | 270/325 | 30 | 26 |

EXAMPLE VI

Grinding Tests of G-CBN

The 60/80 mesh (250-180 micron) fraction from the press runs of Example V were nickel coated and tested in dry grinding of M-2 tool steel. As a control, single-crystal, catalyst-grown CBN of the same mesh size (obtained as BORAZON CBN Type II, a trademark of the General Electric Company) was tested under the same conditions.

Two wheels each of the four abrasive types were fabricated for testing. All of the grinding wheels were standard 3¾ inches 11V9 flaring cup-type resin-bonded wheels (see U.S. Pat. Nos. 3,645,706 and 3,518,068) containing the 60/80 CBN at 18.75 volume percent concentration in a standard resin bond. The dry grinding tests were under the following conditions.

TABLE 6

| | Condition #1 | Condition #2 |
|---|---|---|
| Wheel Speed (meters/second) | 20 | 20 |
| Table Speed (meters/minute) | 2.44 | 2.44 |
| Material (8 pieces) 6.4 × 203 mm² | M-2 | M-2 |
| Infeed (mm) | 0.050 | 0.076 |
| Material Removal Rate ($cm^3 \cdot min^{-1}$) | 0.79 | 1.18 |

The grinding ratio (ratio of volume of workpiece removed to volume of wheel wear) results at each condition are summarized below in Table 7 for each abrasive type.

TABLE 7

| | Infeed - 0.050 mm | | Infeed - 0.076 mm | |
|---|---|---|---|---|
| Abrasive | Mean Grinding Ratio | Relative Grinding Ratio | Mean Grinding Ratio | Relative Grinding Ratio |
| CONTROL | 170 | 1.0 | 64 | 1.0 |
| X-7D1 | 205 | 1.2 | 90 | 1.4 |
| X-7D2 | 195 | 1.2 | 76 | 1.2 |
| X-7D3 | 255 | 1.5 | 110 | 1.7 |

All of the wheels were visually examined with an optical microscope (up to 80X) following testing. The profusion heights of the experimental abrasives were significantly higher than for the control. Further, no wear flat development was observed in the experimental abrasives.

Another preferred mode of this invention, when GBN is the raw material, comprises the incorporation of refractory metal inclusions in the polycrystalline GBN mass during HP/HT processing. The purpose of this modification is similar to the reason for addition of single crystal CBN (i.e., to alter the breakdown characteristics of the polycrystals and/or improve retention of the polycrystals in grinding wheels).

For this modification, between Steps A and B, the vacuum-fired GBN powder is mixed with a quantity of a selected refractory metal powder. The resulting mixture is then converted according to Step B, yielding an aggregate mass comprised of refractory metal powder particles firmly embedded in a boron-rich polycrystalline CBN matrix.

The refractory metals used should not interfere with the conversion of GBN or the sintering of the polycrystalline CBN matrix. Examples of suitable metals are: tantalum, molybdenum and tungsten. The properties of the aggregate will be influenced by the particle size and concentration of the inclusions.

In addition, a highly irregular surface geometry can be obtained by leaching out the metal inclusions from the product to give particles having large surface voids and indentations. The number and size of such voids and indentations will be determined by the size and concentration of the metallic inclusions. This leaching step can be carried out after milling of the recovered CBN masses with an appropriate reagent (e.g., $HNO_3/H_2SO_4$ for molybdenum and $HNO_3/HF$ for tantalum).

EXAMPLE VII

A quantity of GBN powder obtained from Carborundum Company (Grade HPF) was vacuum fired in a number of separate runs at 1760°–1770° C. for 55 minutes. After firing, the initially white powder had a grey appearance due to the free-boron surface coating.

The vacuum-fired powder was then mixed with various refractory metal powders as listed below.

TABLE 8

| Refractory Metal | Mesh Size | Concentration | |
|---|---|---|---|
| | | Weight % | Volume % |
| Molybdenum | 150/325 | 20 | 8.2 |
| | (106/45 microns) | 30 | 12.8 |
| | | 40 | 18.5 |
| Tungsten | 100/200 | 65 | 25.1 |
| | (150/75 microns) | 80 | 41.9 |
| Tantalum | 150/325 | 60 | 23.9 |

TABLE 8-continued

| Refractory Metal | Mesh Size | Concentration Weight % | Volume % |
|---|---|---|---|
| | (106/45 microns) | 75 | 38.6 |

A series of HP/HT conversion experiments were made on samples of the above mixtures using the high pressure cells shown in FIGS. 1 and 2. With the FIG. 1 type cell, samples were loaded in the cell and run in a high pressure apparatus at about 65–70 kbars for 8 minutes at a temperature sufficient for conversion and fusion of the vacuum-fired powder. In the FIG. 2 type cell, samples were pre-pressed in the titanium tube at about 20,000 psi (138 kPa) prior to HP/HT conversion. The resulting composite masses were opaque with the metal inclusions clearly visible as discrete islands in the polycrystalline CBN matrix.

Sufficient quantities of the 12.8 volume percent molybdenum and 23.9 volume percent tantalum material were prepared, impact milled to powder form and size separated to obtain grit for wheel test evaluation. After milling and size separation, the metal inclusions were removed by acid treatment ($HNO_3/H_2SO_4$ for molybdenum and $HNO_3/HF$ for tantalum inclusions) from the size fractions selected for testing as listed in Table 9. The powder was nickel coated.

TABLE 9

| Wheel Test Samples | | | | |
|---|---|---|---|---|
| Sample Designation | Mesh Size | Type Volume % | Metal | Coating Level Weight % |
| X-7DM | 40/60 | 12.8 | Mo | 23.9 |
| X-7DM | 40/60 | 12.8 | Mo | 38.9 |
| X-7DM | 40/60 | 12.8 | Mo | 59.5 |
| X-7DM | 60/80 | 12.8 | Mo | 59.8 |
| X-7DT | 40/60 | 23.9 | Ta | 60.1 |
| X-7DT | 40/80 | 23.9 | Ta | 59.4 |

Figure 5:
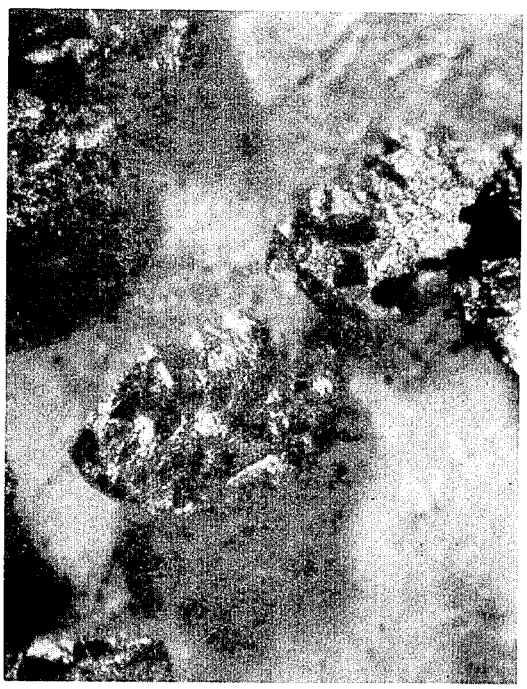
FIG. 5 is a photomicrograph (magnified 50×) showing aggregated cubic boron nitride abrasive particles typical of a preferred embodiment of this invention.

FIG. 5 is a photomicrograph of the acid leached tantalum type material.

From the results obtained with mixtures of the vacuum-fired GBN with either single-crystal CBN or refractory metals, it is felt that other powdered materials which do not interfere with conversion or sintering of CBN can be used to obtain aggregate abrasive CBN masses with improved breakdown characteristics. Examples of materials which have been found not to interfere with conversion or sintering are: tungsten carbide, titanium carbide, boron carbide, and silicon carbide. Examples of materials which are unsuitable for such mixtures are: manganese, manganese boride, and nickel.

Other embodiments of this invention will be apparent to those skilled in the art from a consideration of this specification or practice of the invention disclosed herein. It is intended that the specification and examples be considered as exemplary only, with the true scope and spirit of the invention being indicated by the following claims.

I claim:

1. An improved process for making cubic boron nitride from hexagonal boron nitride powder which comprises subjecting hexagonal boron nitride to the high pressure-high temperature process:
   (i) at a pressure from 55–80 kilobars;
   (ii) at a temperature of 1600° C. to the reconversion temperature;
   (iii) for a time sufficient to convert the hexagonal boron nitride to cubic boron nitride and sinter the cubic boron nitride; and
   (iv) in the absence of catalysts and impurities which interfere with the conversion to cubic boron nitride or the sintering of cubic boron nitride;

wherein the improvement comprises a pretreatment process consisting essentially of removing boric oxide from the surface of the hexagonal boron nitride powder—and generating a coating of boron on the surfaces of the oxide-free hexagonal boron nitride—before conversion to cubic boron nitride, which pretreatment is accomplished by a process carried out at a temperature in the hexagonal boron nitride thermal decomposition range and selected from vacuum firing and heating under inert atmosphere.

2. The improved process as recited in claim 1 wherein: the pretreatment process comprises the vacuum firing of hexagonal boron nitride powder:
   (i) in a non-reactive container;
   (ii) at an initial pressure of from $10^{-3}$–$10^{-10}$ mm Hg;
   (iii) at a temperature of about 1400°–1900° C.; and
   (iv) for a time of from 5 minutes to 4 hours; and the conditions of the high pressure-high temperature process are:
   (i) a pressure of from 65–75 kilobars;
   (ii) a temperature of 2000°–2300° C.; and
   (iii) a time of about 8 minutes; and which further comprises recovering CBN masses after the high pressure-high temperature conversion.

3. The improved process as recited in claim 2 wherein the high pressure-high temperature process is performed in a reaction cell which comprises: a carbon tube; a shield metal sleeve disposed within and concentric to the carbon tube, which sleeve is made of refractory metal, plugs made of a refractory material which is a thermal insulator disposed at the opposite ends of and within the cylinder defined by the shield metal sleeve; foil discs, made from a refractory metal, disposed inside the cylinder and adjacent to the end plugs; plugs of carbon disposed inside the cylinder and adjacent to the shield metal discs; and the hexagonal boron nitride powder disposed within the central cavity defined by the carbon plugs and the shield metal tube.

4. The improved process as recited in claim 2 which further comprises prepressing the hexagonal boron nitride samples in the shield metal sleeve before the high pressure-high temperature process.

5. The improved process as recited in claim 2 wherein graphite is mixed with the hexagonal boron nitride in the high pressure-high temperature process.

6. The improved process as recited in claim 2 which further comprises milling the cubic boron nitride masses into grinding grit.

7. The improved process as recited in claim 6 in which the hexagonal boron nitride is pyrolytic boron nitride.

8. The improved process as recited in claim 7 wherein the high pressure high temperature process takes place at 2000°–2100° C.

9. The improvd process as recited in claim 8 wherein the conditions of the pretreatment process are:
   (i) temperature of 1580°–1615° C.; and
   (ii) time of 60–90 minutes.

10. Cubic boron nitride grit which comprises polycrystalline cubic boron nitride particles made from pyrolytic boron nitride obtained by the process of claim 8.

11. Cubic boron nitride grit which comprises polycrystalline cubic boron nitride particles made from pyrolytic boron nitride obtained by the process of claim 9.

12. A resin-bonded grinding wheel containing the cubic boron nitride abrasive particles of claims 10 or 11.

13. The resin-bonded grinding wheel of claim 12 wherein the cubic boron nitride abrasive particles are nickel coated.

14. The method of grinding high speed tool steel which comprises grinding with the grinding wheel of claim 13.

15. The product of the process recited in claim 2 or claim 6 wherein the hexagonal boron nitride is graphitic boron nitride.

16. The improved process as recited in claim 2 or claim 6 which further comprises mixing the vacuum-fired hexagonal boron nitride powder from the pretreatment process with a quantity of single-crystal cubic boron nitride particles having a maximum dimension ranging from 5 to 150 microns in a concentration of 5–30 volume percent single crystal cubic boron nitride crystals, which process yields aggregate cubic boron nitride masses comprised of single-crystal cubic boron nitride particles embedded in a boron-rich, polycrystalline cubic boron nitride matrix.

17. The improved process as recited in claim 16 wherein the hexagonal boron nitride has the graphitic crystal structure.

18. The aggregated cubic boron nitride masses made by the process of claim 17.

19. The grinding grit comprised of aggregated cubic boron nitride masses as recited in claim 18.

20. A resin-bonded grinding wheel containing the grinding grit of claim 19.

21. The resin-bonded grinding wheel of claim 20 wherein the grinding grit is nickel coated.

22. The method of grinding high speed tool steel which comprises grinding with the grinding wheel of claim 21.

23. The improved process as recited in claims 2 or 6 which further comprises mixing the vacuum-fired hexagonal boron nitride powder from Step A with a quantity of a powdered material which does not interfere with the conversion of the hexagonal boron nitride or the sintering of the cubic boron nitride, which process yields aggregate cubic boron nitride masses comprised of polycrystalline cubic boron nitride with inclusions.

24. The improved process of claim 23 wherein the powdered material mixed with the vacuum-fired HBN is a refractory metal.

25. The improved process as recited in claim 24 which further comprises leaching out the refractory metal inclusions from the product.

26. The polycrystalline cubic boron nitride masses made by the process of claim 25.

27. The grinding grit comprised of aggregated cubic boron nitride masses as recited in claim 26.

28. A resin-bonded grinding wheel containing the grinding grit of claim 27.

29. The resin-bonded grinding wheel of claim 28 wherein the grinding grit is nickel coated.

30. The method of grinding high speed tool steel which comprises grinding with the grinding wheel of claim 29.

31. The improved process as recited in claim 24 wherein the hexagonal boron nitride has the graphitic crystal structure.

32. The aggregated cubic boron nitride masses made by the process of claim 31.

33. The grinding grit comprised of aggregated cubic boron nitride masses as recited in claim 32.

34. A resin-bonded grinding wheel containing the grinding grit of claim 33.

35. The resin-bonded grinding wheel of claim 34 wherein the grinding grit is nickel coated.

36. The method of grinding high speed tool steel which comprises grinding with the grinding wheel of claim 35.

37. An aggregated cubic boron nitride abrasive particle consisting essentially of single-crystal, catalyst-grown cubic boron nitride embedded in a matrix of boron-rich, polycrystalline cubic boron nitride made from graphitic hexagonal boron nitride.

38. An aggregated cubic boron nitride abrasive particle consisting essentially of refractory metal powder particles embedded in a matrix of boron-rich, polycrystalline cubic boron nitride made from graphitic hexagonal boron nitride.

39. A boron-rich polycrystalline cubic boron nitride particle made from graphitic hexagonal boron nitride which particle has surface voids and indentations.

* * * * *